(12) United States Patent
Nies

(10) Patent No.: US 8,282,351 B2
(45) Date of Patent: Oct. 9, 2012

(54) SPLIT LOAD PATH GEARBOX

(75) Inventor: Jacob Johannes Nies, Zwolle (NL)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/297,303

(22) Filed: Nov. 16, 2011

(65) Prior Publication Data

US 2012/0134805 A1 May 31, 2012

(51) Int. Cl.
*F16H 47/04* (2006.01)
(52) U.S. Cl. ............... 416/1; 416/170 R; 415/1; 415/4.3; 415/124.1; 415/124.2; 415/908
(58) Field of Classification Search .......... 416/1, 170 R; 415/1, 4.3, 4.5, 122.1, 124.2, 908
See application file for complete search history.

(56) References Cited

U.S. PATENT DOCUMENTS

| 6,790,156 | B2* | 9/2004 | Hosle | 290/44 |
| 7,008,348 | B2* | 3/2006 | LaBath | 475/338 |
| 2005/0280264 | A1* | 12/2005 | Nagy | 290/55 |
| 2009/0023532 | A1 | 1/2009 | Parraga Gimeno | |

* cited by examiner

*Primary Examiner* — Igor Kershteyn
(74) *Attorney, Agent, or Firm* — Global Patent Operation; Douglas D. Zhang

(57) ABSTRACT

A gearbox for a wind turbine, comprising a first planetary gear set; and a second planetary gear set having the same transmission ratio as the first planetary gear set; and, a load splitter to split the torque between the first planetary gear set and the second planetary gear set, wherein the load splitter is adapted to provide slip for absorbing deviations in the rotational position between the first planetary gear set and the second planetary gear set; and, wherein the first planetary gear set and the second planetary gear set are coupled in a split load arrangement for transmitting torque from a rotor shaft to a high speed shaft.

20 Claims, 4 Drawing Sheets

SPLIT LOAD PATH GEARBOX

BACKGROUND OF THE INVENTION

The subject matter described herein relates generally to methods and systems for wind turbines, and more particularly, to methods and systems relating to gearboxes for wind turbines.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

At least some known wind turbines include gearboxes to transmit torque from a rotor shaft to a high speed shaft. The rotor shaft is driven by the rotor blades of the wind turbine. The high speed shaft is coupled to the generator.

In recent years wind turbines having an increased nominal power have been developed. Increased nominal power demands gearboxes having an increased outer diameter for transmitting the torque from the rotor blades to the generator. Gearboxes become increasingly expensive as their outer diameter grows. Furthermore, available space in a nacelle of a wind turbine is restricted. US 2010/0120573 A1 discloses a planetary gear box having multiple sun pinions with a limited balance of the load split between the load paths.

Therefore, it is desirable to have gearboxes capable of transmitting torque from a rotor shaft to a high speed shaft with a way around the growing outer diameter for high torques using a split load arrangement with a balanced splitting of the load between at least two gear sets.

BRIEF DESCRIPTION OF THE INVENTION

In one aspect, a gearbox for a wind turbine is provided, including a first planetary gear set, a second planetary gear set having the same transmission ratio as the first planetary gear set, and, a load splitter to split the torque between the first planetary gear set and the second planetary gear set, wherein the load splitter is adapted to provide slip for absorbing deviations in the rotational position between the first planetary gear set and the second planetary gear set, and, wherein the first planetary gear set and the second planetary gear set are coupled in a split load arrangement for transmitting torque from a rotor shaft to a high speed shaft.

In another aspect, a wind turbine is provided, including a rotor, a rotor shaft connected with the rotor, a high speed shaft, an electric generator connected with the high speed shaft, and a gearbox connecting the rotor shaft with the high speed shaft, the gearbox including a first load path, and a second load path, the load paths connecting the rotor shaft with the high speed shaft, and a load splitter for splitting a torque of the rotor shaft between the two load paths, wherein the load splitter comprises a first pulley and a second pulley being connected by a V belt.

In yet another aspect, a method of operating a wind turbine is provided, the method including providing an electrical machine, providing a rotor, providing a gearbox for connecting the rotor with the generator, wherein the gearbox comprises two load paths, and, splitting the torque of the rotor between the two load paths using a load splitter, wherein the load splitter is adapted to provide slip for absorbing deviations in the rotational position or speed between the load paths.

Further aspects, advantages, and features of the present invention are apparent from the dependent claims, the description, and the accompanying drawings.

BRIEF DESCRIPTION OF THE DRAWINGS

A full and enabling disclosure, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in the figures. Within the following description of the drawings, the same reference numbers refer to the same components. Generally, only the differences with respect to individual embodiments are described. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine that is capable of generating high power. More specifically, the gearbox of embodiments is capable of transmitting high torque, wherein the dimensions of the gearbox are suitable for arranging the gearbox within the nacelle. In addition, some embodiments do not necessarily need a converter.

As used herein, the term "gearbox" is intended to be representative of any device connecting a rotor to an electrical machine of a wind turbine for transmitting power. In embodiments, the electrical machine is a wind generator. As used herein, the term "blade" is intended to be representative of any device that provides a reactive force when in motion relative to a surrounding fluid. As used herein, the term "wind turbine" is intended to be representative of any device that generates electrical power from rotational energy generated from wind energy, and more specifically, converts mechanical energy converted from kinetic energy of wind to electrical power.

Figure 1:
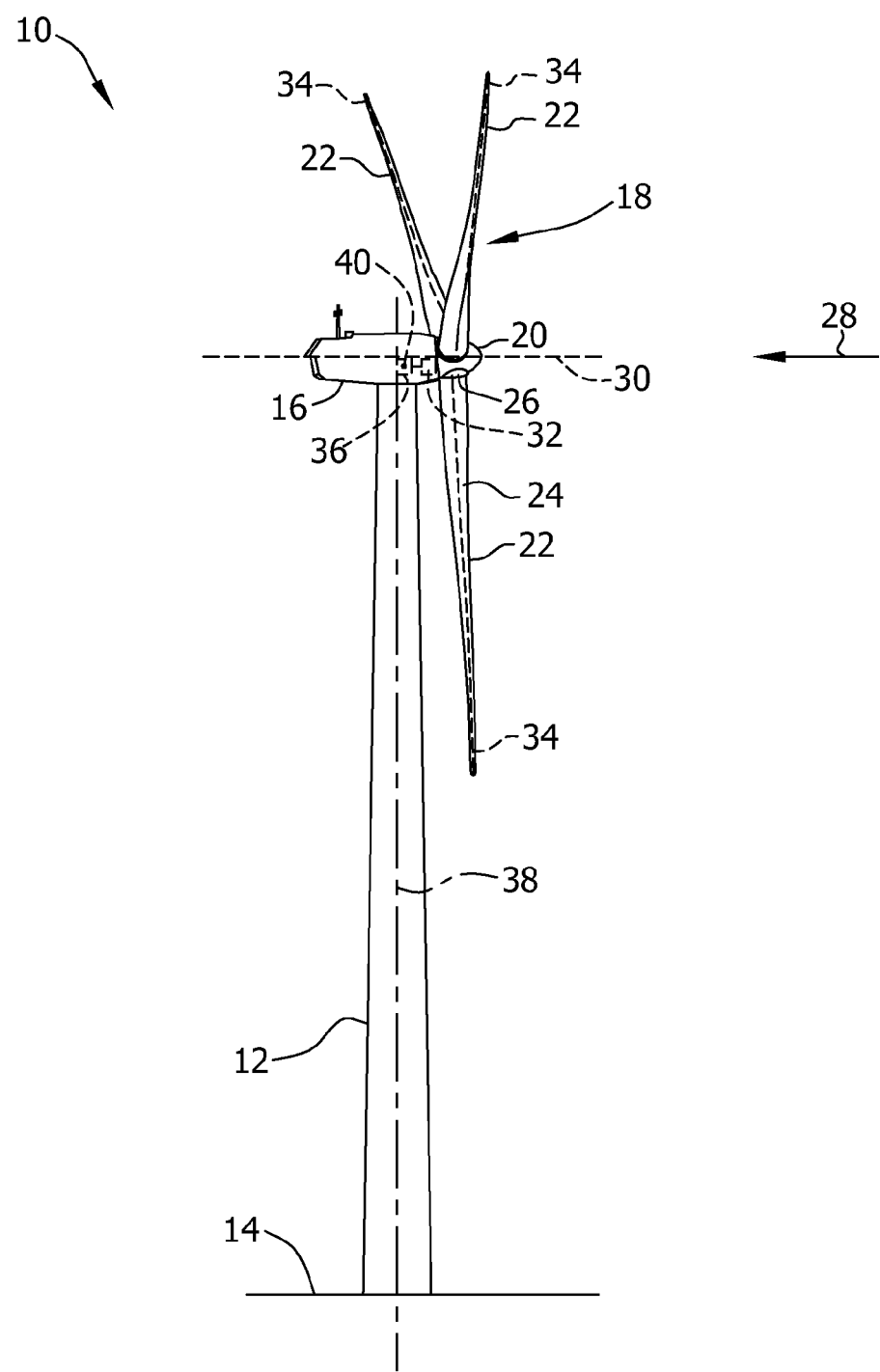
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
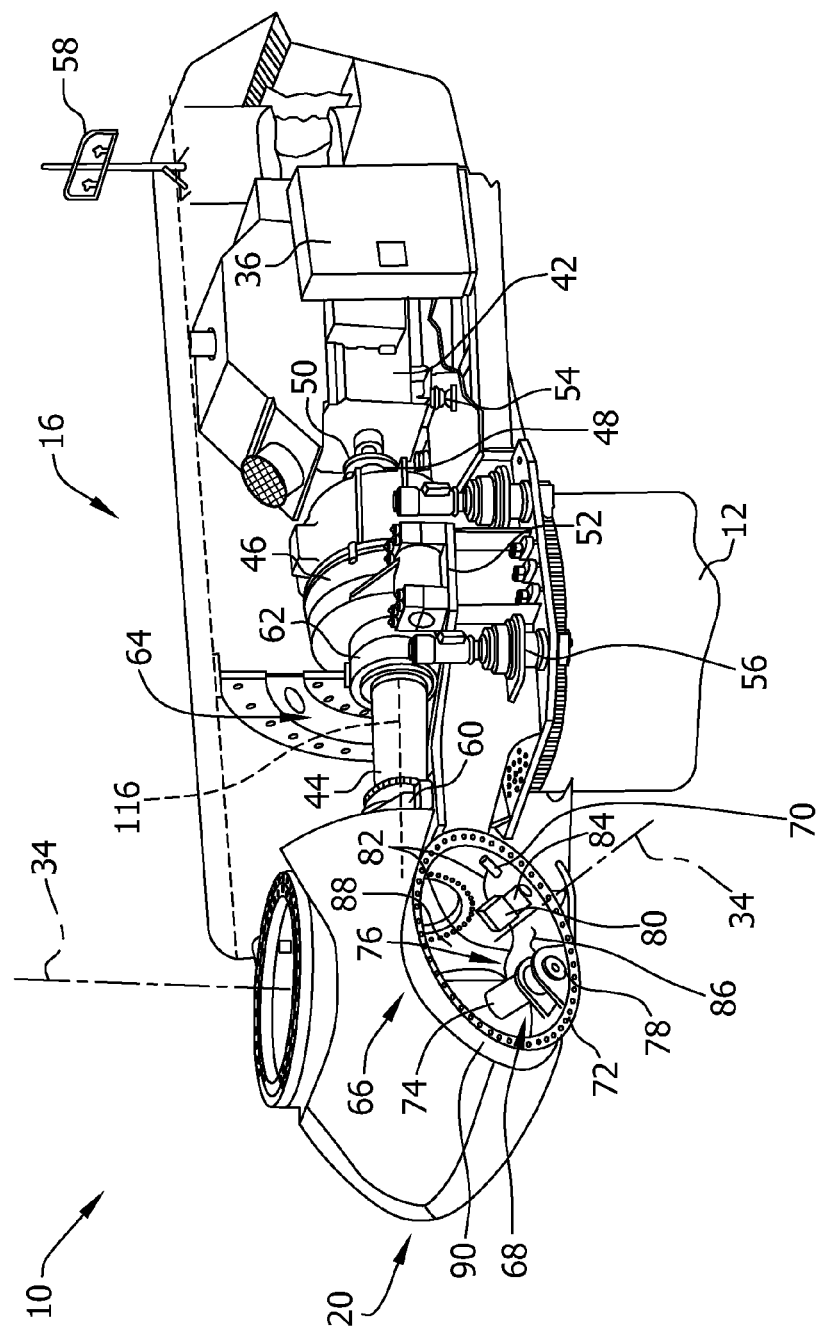
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 20 and may be coupled, directly or indirectly, to outer surface 90.

Figure 3:
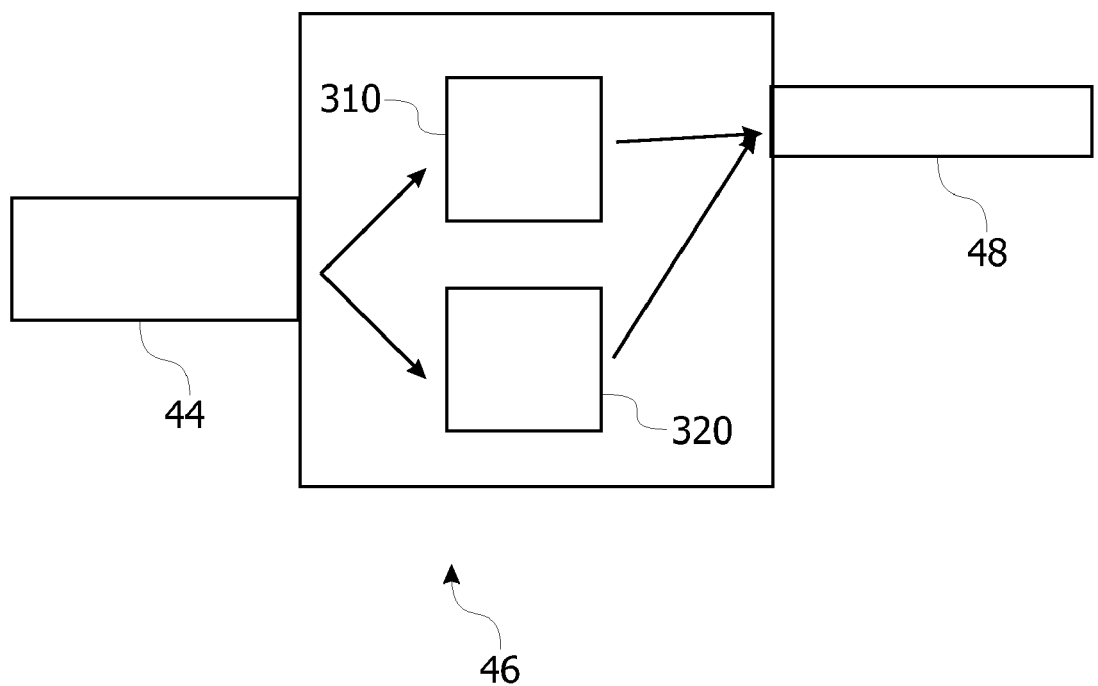
FIG. 3 is a sectional view of an exemplary gearbox.

FIG. 3 is a schematic diagram of an exemplary embodiment of the gearbox 46 together with other parts of an exemplary embodiment of the wind turbine 10. The gearbox 46 includes a first planetary gear set 310 and a second planetary gear set 320. The first planetary gear set 310 and the second planetary gear set 320 have the same transmission ratio. A split load arrangement of the first planetary gear set 310 and the second planetary gear set 320 is used in the gearbox 46 for transmitting torque from the rotor shaft 44 of the wind turbine 10 to the high speed shaft 48 of the wind turbine 10.

Embodiments described herein typically include two load paths for connecting the rotor shaft with the high speed shaft. Two load paths or a split load arrangement is used to divide the torque transmitted from the rotor shaft to the high speed shaft between the two load paths. By doing so, the torque transmitted by each of the first planetary gear set and the second planetary gear set or by each of the load paths is reduced in comparison to transmission along only one load paths. Hence, smaller gear sets can be used, e.g. having smaller diameters compared to an arrangement without a split load arrangement. Typical load splitters of embodiments are adapted to provide slip for absorbing deviations in the rotational position or speed between the first planetary gear set and the second planetary gear set. Herein, the term "deviation of speed" is to be construed as being included in the term "deviation in the rotational position". By allowing slip, a substantially equal splitting between the two load paths may be achieved. Typical embodiments use a pulley as a slip member of the load splitter. Between a belt and a sheave or cone of a pulley slip may arise. Typical load splitters include a CVT (continuously variable transmission). Exemplary belts include a V-belt or a chain. Pulleys according to embodiments may include sheaves which may be rotated independently. That means that one of the pulleys of exemplary embodiments may be divided in a plane perpendicular to the axis of rotation. Typical load splitters include pulleys or cone-CVTs. Exemplary cone-CVTs include one cone and a wheel. Further embodiments of a cone-CVT include two cones. Typical Cone-CVTs used in embodiments provide slip. By using a pulley with a belt, slip between the sheaves of the pulley and a belt or another torque transmitting means may absorb small angular deviations in the rotational position or speed.

In typical embodiments described herein, the torque is split at least substantially equally. The term "substantially equally" relates typically to a load splitting with a maximum divergence of +/−50% or +/−20% between the load paths or between the first planetary gear set and the second planetary gear set. Other typical embodiments have a maximum of divergence between the load paths or gear sets of +/−10%, or +/−5%. In exemplary embodiments, a maximum divergence of +/−3% or +/−2% between the load paths or gear sets is achieved. Thereby, all gear sets may be operated at substantially the same capacity.

Figure 4:
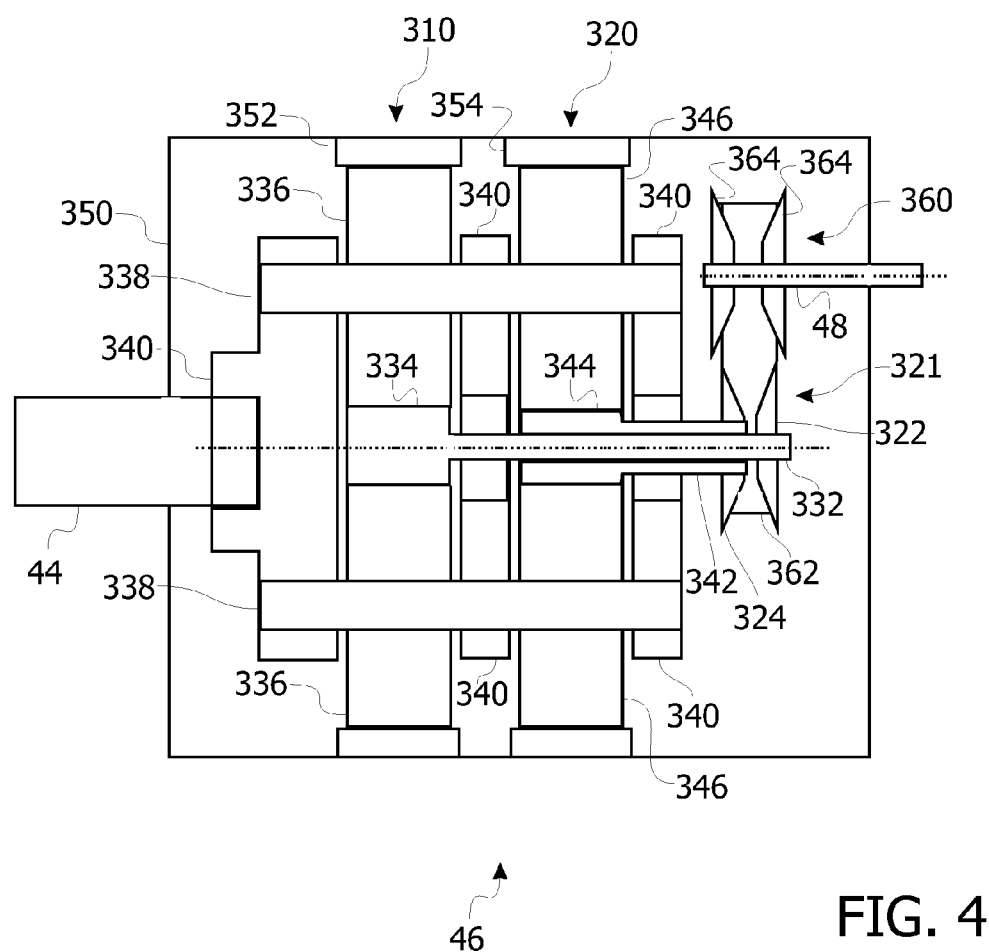
FIG. 4 is a sectional view of an exemplary gearbox.

In FIG. 4, a sectional view of an exemplary embodiment is shown. The gearbox 46 includes a load splitter to split the torque between the planetary gear sets 310 and 320. The load splitter includes a first pulley 321, wherein a first sheave 322 is connected with the first planetary gear set 310 and a second sheave 324 of the first pulley 321 is connected with the second planetary gear set 320. The first sheave 322 is connected to a first output shaft 332 which in turn is connected to a first sun gear 334 of the first planetary gear set 310. The first sun gear 334 is driven by first planetary gears 336. The first planetary gears 336 are arranged on planetary axles 338. The planetary axles 338 are mounted in a common planetary carrier 340. The second sheave 324 is connected to a second output shaft 342 which in turn is connected to a second sun gear 344. The second sun gear 344 is driven by the second planetary gears 346 of the second planetary gear set 320. The second planetary gears 346 rotate about the same axles 338 as the first planetary gears 336.

Exemplary embodiments include a pulley as load splitter. Exemplary pulleys include a first sheave and a second sheave, wherein each of the sheaves is connected with one of two planetary gears sets, respectively. Typically, the sheaves of the pulley may rotate independently from each other. Small angular deviations in the rotational position or speed can be absorbed by the slip between the sheaves and a belt connecting the pulley with a second pulley. In typical embodiments, the sheaves are connected with the sun gears of the planetary gear sets. Other exemplary embodiments include a connection between the sheaves and the respective planet carriers or the respective ring gears of the planetary gear sets. In exemplary embodiments, the sheaves are connected by a first output shaft and a second output shaft with the respective planetary gear sets.

Typically, the maximum divergence between the torsional stiffness of both load paths or both gear sets is +/−50% or +/−20% or +/−10%. Exemplary embodiments have a maximum divergence between the torsional stiffness of both load paths or both gear sets of +/−5% or +/−2%. The torsional stiffness of one of the load paths relates typically to the torsional stiffness between the rotor shaft and the pulley or the respective sheave of the pulley. In exemplary embodiments, the torsional stiffness of the load paths is adjusted by choosing the geometry parameters of the output shafts connecting the sun gears with the first sheave. Typical geometry parameters which may be altered for adjusting the torsional stiffness are: length, outer diameter or inner diameter of the output shafts. By doing so, a stiffness matching may be achieved. This may lead to less slip between the sheaves and the belt. In typical embodiments, the planetary gears sets are arranged in an axial arrangement. With such an arrangement, the sun gears of the planetary gear sets are typically arranged such that they rotate about the same axis. Other examples include planetary gear sets arranged in parallel or arrangements with sun gears rotating about different axis. Especially with embodiments having an axial arrangement of the planetary gear sets, a common ring gear or a common housing for the planetary gear sets may be used. This serves for a simple construction. By arranging the planetary gear sets in an axial arrangement, a very compact gearbox can be achieved.

Typically, the second sun gear of the second planetary gear set is connected to the second output shaft, wherein the second output shaft is arranged co-axial to the first output shaft. The first sun gear of the first planetary gear set is typically connected to the first output shaft. In further exemplary embodiments, the output shafts are arranged on different axes, wherein the sheaves may be driven by additional gears sets or may be directly driven. By arranging the output shafts co-axially, the first output shaft can be provided as a hollow shaft to encompass at least a part of the second output shaft. By doing so, a very compact gearbox may be achieved, wherein both or all planetary gear sets are arranged on one side of the first pulley. Further embodiments include planetary gear sets arranged on both sides of the first pulley. By doing so, hollow shafts can be avoided.

The gearbox 46 of FIG. 4 includes a common housing 350, in which a first fixed ring gear 352 for the first planetary gear set 310 and a second fixed ring gear 354 for the second planetary gear set 320 is arranged.

The first pulley 321 is connected to a second pulley 360 via a V belt 362. The pulleys 321 and 360 have the same size. In further exemplary embodiments, the second pulley has a smaller diameter compared to the diameter of the first pulley. By doing so, the torque acting on the first pulley and the force acting on the V belt may be reduced.

The second pulley 360 includes shifting means for an axial shifting of sheaves 364 of the second pulley 360. The sheaves 364 of the second pulley 360 may be shifted such that the transmission ratio of the pulley—belt arrangement may be altered. By doing so, a converter may sometimes be obsolete.

Further embodiments include fixed sheaves for both pulleys. Other exemplary embodiments include a first pulley having shifting means for its sheaves. Other exemplary embodiments include shifting means for the sheaves of both pulleys. By doing so, a broad transmission ratio range may be achieved.

The second pulley 360 is connected to the high speed shaft 48. The high speed shaft 48 in turn is connected with the electric generator 42 as shown in FIG. 2. In the shown exemplary embodiment, the electric generator 42 includes a synchronous electrical machine. Synchronous electrical machines provide high power at cheap costs. In further embodiments, the generator includes an asynchronous electrical machine.

The exemplary embodiment shown in FIG. 4 provides a ratio of the overall length of the axially arranged planetary gear sets 310 and 320 to the outer diameter of the gear sets 310 and 320 of approximately 1:1.

Typical embodiments provide a ratio of the overall length of the actually arranged planetary gear sets to the outer diameter of the gear sets of more than 0.5, or more than 0.7 or more than 0.9. Such ratios provide compact gearboxes.

Typical embodiments provide compactness with axially arranged planetary gear sets. Exemplary embodiments provide variable transmission between the two pulleys using shifting means for the sheaves of at least one of the pulleys. Further embodiments combine compactness and variable transmission. By using the sheaves of a pulley of the variable transmission as load splitter, the torque shares over the two load paths or over the two planetary gear sets is equalized. Slip of the belt is typically accepted for equalizing the load. Slip may be reduced using a matching of the torsional stiffness of the two load paths.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gearbox for a wind turbine, comprising:
   a first planetary gear set;
   a second planetary gear set having the same transmission ratio as the first planetary gear set; and
   a load splitter to split the torque between the first planetary gear set and the second planetary gear set, wherein the load splitter is configured to provide slip for absorbing deviations in the rotational position between the first planetary gear set and the second planetary gear set;
   wherein the first planetary gear set and the second planetary gear set are coupled in a split load arrangement for transmitting torque from a rotor shaft to a high speed shaft.

2. The gearbox according to claim 1, wherein a first sheave of a first pulley is connected with the first planetary gear set and a second sheave of the first pulley is connected with the second planetary gear set.

3. The gearbox according to claim 2, wherein a first output shaft of the first planetary gear set is connected to the first sheave of the first pulley and a second output shaft of the second planetary gear set is connected to the second sheave of the first pulley.

4. The gearbox according to claim 1, wherein the first planetary gear set and the second planetary gear set are arranged in an axial arrangement.

5. The gearbox according to claim 3, wherein a second sun gear of the second planetary gear set is connected to the second output shaft, the second output shaft being arranged coaxial to the first output shaft, wherein a first sun gear of the first planetary gear set is connected to the first output shaft.

6. The gearbox according to claim 5, wherein the first output shaft is hollow to encompass at least a part of the second output shaft.

7. The gearbox according to claim 1, further comprising a second pulley, the second pulley being connected with the first pulley.

8. The gearbox according to claim 7, wherein the second pulley is connected to the high speed shaft.

9. The gearbox according to claim 7, wherein at least one of the first pulley and the second pulley comprise a shifting mechanism configured to shift the first sheave and the second sheave axially.

10. The gearbox according to claim 7, wherein the second pulley has a smaller diameter compared to the diameter of the first pulley.

11. The gearbox according to claim 1, wherein the first planetary gear set and the second planetary gear set comprise a common planetary carrier carrying first planetary gears of the first planetary gear set and second planetary gears of the second planetary gear set.

12. The gearbox according to claim 4, wherein the ratio of the overall length of the axially arranged first planetary gear set and second planetary gear set to the outer diameter of the first planetary gear set and the second planetary gear set is greater than 0.5.

13. The gearbox according to claim 3, wherein the maximum divergence of the torsional stiffness between a first load path and a second load path of the gearbox is +/−50%, wherein the first load path comprises the first planetary gear set and the first output shaft and the second load path comprises the second planetary gear set and the second output shaft.

14. The gearbox according to claim 1, wherein the high speed shaft is connected to an electrical generator.

15. A wind turbine comprising:
   a rotor;
   a rotor shaft connected with the rotor;
   a high speed shaft;
   an electric generator connected with the high speed shaft; and
   a gearbox connecting the rotor shaft with the high speed shaft, the gearbox comprising:
   a first load path;
   a second load path, wherein the first load path and the second load path connect the rotor shaft with the high speed shaft; and
   a load splitter for splitting a torque of the rotor shaft between the first load path and the second load path,
   wherein the load splitter comprises a first pulley and a second pulley being connected by a V belt.

16. The wind turbine according to claim 15, wherein a first sheave of the first pulley is connected with the first load path and a second sheave of the first pulley is connected with the second load path.

17. The wind turbine according to claim 15, wherein the maximum divergence of the torsional stiffness of the first load path and the second load path is +/−50%.

18. A method of operating a wind turbine, the method comprising:
   providing an electric generator;
   providing a rotor;
   providing a gearbox for connecting the rotor with the electric generator, wherein the gearbox comprises two load paths; and
   splitting the torque of the rotor between the two load paths using a load splitter, wherein the load splitter is configured to provide slip for absorbing deviations in the rotational position or speed between the two load paths.

19. The method of claim 18, further comprising
   providing the two load paths with a maximum divergence of the torsional stiffness of the two load paths of +1-50%.

20. The method of claim 18, further comprising
   providing the load splitter with a first sheave of a pulley and a second sheave of the pulley and a V belt to provide slip between the first sheave or the second sheave and the V belt, wherein the first sheave is connected to a first load path of the two load paths and the second sheave is connected to a second load path of the two load paths.

* * * * *

UNITED STATES PATENT AND TRADEMARK OFFICE
CERTIFICATE OF CORRECTION

PATENT NO. : 8,282,351 B2  Page 1 of 1
APPLICATION NO. : 13/297303
DATED : October 9, 2012
INVENTOR(S) : Nies It is certified that error appears in the above-identified patent and that said Letters Patent is hereby corrected as shown below:

In Column 9, Line 41, in Claim 7, delete "claim 1," and insert -- claim 2, --, therefor.

In Column 10, Line 50, in Claim 19, delete "+1-50%." and insert -- +/-50%. --, therefor.

Signed and Sealed this
Twenty-ninth Day of January, 2013

David J. Kappos
*Director of the United States Patent and Trademark Office*